US010567996B2

(12) United States Patent
Jiang et al.

(10) Patent No.: US 10,567,996 B2
(45) Date of Patent: Feb. 18, 2020

(54) SYSTEMS AND METHODS FOR SEGMENTATION AND REASSEMBLY OF DATA FRAMES IN 802.11 WIRELESS LOCAL AREA NETWORKS

(71) Applicant: Marvell World Trade Ltd., St. Michael (BB)

(72) Inventors: Jinjin Jiang, San Jose, CA (US); Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/916,940

(22) Filed: Mar. 9, 2018

(65) Prior Publication Data
US 2018/0262951 A1 Sep. 13, 2018

Related U.S. Application Data

(60) Provisional application No. 62/469,345, filed on Mar. 9, 2017.

(51) Int. Cl.
*H04J 3/24* (2006.01)
*H04W 28/06* (2009.01)
*H04L 12/801* (2013.01)
*H04L 1/00* (2006.01)
*H04L 12/805* (2013.01)

(52) U.S. Cl.
CPC ......... *H04W 28/065* (2013.01); *H04L 1/0007* (2013.01); *H04L 47/34* (2013.01); *H04L 47/14* (2013.01); *H04L 47/365* (2013.01)

(58) Field of Classification Search
CPC ......... H04L 29/0653; H04L 2012/5652; H04L 1/0028
See application file for complete search history.

(56) References Cited

U.S. PATENT DOCUMENTS

| 6,212,190 B1 | 4/2001 | Mulligan | |
| 2004/0142710 A1* | 7/2004 | Liang | H04L 63/123 |
| | | | 455/466 |
| 2004/0218630 A1 | 11/2004 | An | |

(Continued)

OTHER PUBLICATIONS

International Search Report and Written Opinion for International Application No. PCT/US2018/021824 dated Jun. 14, 2018.

*Primary Examiner* — Siren Wei

(57) ABSTRACT

Embodiments described herein provide a method for fragmenting and reassembling data frames on a medium access control (MAC) layer in a wireless local area network. A datagram is received from an application running on a first network device, for transmission over a wireless communication link in the wireless local area network. A negotiation request is initiated with a second network device for determining whether both the first network device and the second network device have enhanced directional multi-gigabit capability (EDMG) for data segmentation and reassembly. When both devices have EDMG capability and the size of the datagram exceeds the maximum size defined by the wireless local area network transmission protocol, the datagram is segmented into a plurality of transmission data units on the MAC layer.

20 Claims, 8 Drawing Sheets

(56) References Cited

U.S. PATENT DOCUMENTS

| | | |
|---|---|---|
| 2005/0053066 A1* | 3/2005 | Famolari ............. H04L 12/6418 |
| | | 370/389 |
| 2006/0018315 A1 | 1/2006 | Baratakke et al. |
| 2010/0180171 A1* | 7/2010 | Liu ....................... H04L 69/324 |
| | | 714/748 |
| 2017/0034823 A1 | 2/2017 | Cariou et al. |
| 2017/0201992 A1* | 7/2017 | Cordeiro ............. H04W 40/244 |
| 2018/0006753 A1* | 1/2018 | Trainin ................... H04B 7/04 |

* cited by examiner

SYSTEMS AND METHODS FOR SEGMENTATION AND REASSEMBLY OF DATA FRAMES IN 802.11 WIRELESS LOCAL AREA NETWORKS

CROSS-REFERENCE TO RELATED APPLICATION

This disclosure claims the benefit under 35 U.S.C. § 119(e) of U.S. Provisional Patent Application No. 62/469,345, filed Mar. 9, 2017, which is hereby incorporated by reference herein in its entirety.

FIELD OF USE

This disclosure relates to data transmission protocols in 802.11 wireless networks, and specifically, to systems and methods for segmentation and reassembly of data frames in 802.11 wireless local area networks (WLANs).

BACKGROUND OF THE DISCLOSURES

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Data frames transmitted in an 802.11 network usually has a significant amount of overhead, including radio level headers, Media Access Control (MAC) frame fields, interframe spacing information, acknowledgement information of transmitted frames, and/or the like. The transmission of the overhead information sometimes consumes a significant portion of the channel bandwidth, and thus reduces transmission efficiency of the payload data. MAC service data unit (MSDU) aggregation is thus used to group several data frames into one large frame for transmission, i.e., an A-MSDU, such that the several grouped data frames can share management information in the overhead for the large frame. In this way, the ratio of payload data to the total volume of data transmitted is improved, allowing higher throughput.

An MSDU, however, often has a limited size. For example, in 802.11ad, the maximum MSDU size is 7920 bytes. When an application generates a large datagram, e.g., sometimes can be much larger than 7920 bytes, the datagram is usually required to be segmented in order to fit into an MSDU to be transmitted over an 802.11ad link. However, significant computational overhead may be inflicted to the host processor when the host processor segments the large datagram on the application layer.

SUMMARY

Embodiments described herein provide a method for fragmenting and reassembling data frames on a medium access control (MAC) layer in a wireless local area network. A datagram is received from an application running on a first network device, for transmission over a wireless communication link in the wireless local area network. a negotiation request is initiated, at the first network device, with a second network device for determining whether both the first network device and the second network device have enhanced directional multi-gigabit capability (EDMG) for data segmentation and reassembly. A size of the datagram is determined as to whether the size of the datagram exceeds a maximum size defined by a wireless local area network transmission protocol. When the size of the datagram exceeds the maximum size defined by the wireless local area network transmission protocol and both the first network device and the second network device have EDMG capability for data segmentation and reassembly, the datagram is segmented into a plurality of transmission data units on the MAC layer, and identifying information is assigned to a respective data field in each transmission data unit from the plurality of transmission data units. The plurality of transmission data units are transmitted to the second network device transmitting, via the wireless communication link in the wireless local area network.

In some embodiments, the datagram is segmented into fragmented data units. Each fragmented data unit has a size smaller than the maximum size defined by a wireless local area network transmission protocol.

In some embodiments, for each transmission data unit that belongs to the plurality of transmission data units segmented from the same datagram, the same sequence number is assigned to a first portion of a sequence control field in the respective transmission data unit, and a unique fragment number is assigned to a second portion of the sequence control field in the respective transmission data unit. The unique fragment number represents a respective index for the respective transmission data unit in the plurality of transmission data units segmented from the same datagram. A binary value is assigned, which indicates whether there are more transmission data units segmented from the same datagram following the respective transmission data unit to a third portion of the sequence control field in the respective transmission data unit.

In some embodiments, a legacy sequence control field defined in a legacy wireless local area network transmission protocol is reused as the sequence control field. The first three bits of the sequence control field are designated for the unique fragment number. The fourth bit of the sequence control field is designated for the binary value that indicates whether there are more transmission data units segmented from the same datagram following the respective transmission data unit. The remaining 12 bits of the sequence control field are designated for the sequence number. The transmission data units with a same sequence number belong to the same datagram.

In some embodiments, a first transmission data unit is received, at the first network device. A first data bit is extracted, which indicates whether there are more transmission data units segmented from a same datagram following the first transmission data unit and a first fragment number from a first sequence control field of the first transmission data unit. When the data bit equals one, a subsequent transmission data unit that belongs to the same datagram with the first transmission data unit is received. When the data bit equals zero, any subsequent transmission data unit is determined to belong to a different datagram. The first fragment number is determined as to whether the first fragment number equals zero. When the first fragment number is non-zero, a second data bit is extracted, which indicates whether there are more transmission data units segmented from a same datagram following the preceding transmission data unit from a preceding transmission data unit. When the second data bit equals one, the transmission data unit is determined to be an EDMG fragmentation segment. When the second data bit equals zero, the transmission data unit is determined to be a legacy fragmentation segment. When the first fragment number is zero, the transmission data unit is determined as not having been segmented. A sequence of previously received transmission data units including the first transmission data unit are reassembled to form one or more datagrams based on segmentation information relating to the transmission data units.

In some embodiments, for each transmission data unit that belong to the plurality of transmission data units segmented from the same datagram, the same index number is assigned to a first portion of a sequence control field in the respective transmission data unit. A continuous sequence number is assigned to a second portion of the sequence control field in the respective transmission data unit. A binary value is assigned, which indicates whether there are more transmission data units segmented from the same datagram following the respective transmission data unit to a third portion of the sequence control field in the respective transmission data unit.

In some embodiments, a legacy sequence control field used in a legacy wireless local area network transmission protocol is re-defined as the sequence control field. The first three bits of the sequence control field are designated for the index number. The fourth bit of the sequence control field is designated for the binary value that indicates whether there are more transmission data units segmented from the same datagram following the respective transmission data unit. The remaining 12 bits of the sequence control field are designated for the continuous sequence number. The transmission data units with the same index number and continuous sequence numbers belong to the same datagram.

In some embodiments, a first transmission data unit is received, at the first network device. A first data bit is extracted, which indicates whether there are more transmission data units segmented from a same datagram following the first transmission data unit from a first sequence control field of the first transmission data unit. When the first data bit equals one, a second transmission data unit is received subsequent to the first transmission data unit. When the second data bit equals zero, a set of previously received transmission data units prior to and including the first transmission data unit are retrieved. A respective index number and a respective sequence number are extracted from a respective sequence control field of each of the set of previously received transmission data units.

In some embodiments, a first index number and a first sequence number are extracted from the from the first sequence control field of the first transmission data unit. A second index number and a second sequence number are extracted from a second sequence control field of the second transmission data unit. The index numbers of two consecutive transmission units are determined as to whether the index numbers are the same. When the index numbers of two consecutive transmission units are the same, it is then determined whether sequence numbers of the two consecutive transmission units are continuous. When the sequence numbers of the two consecutive transmission units are continuous, it is further determined that the two consecutive transmission units belong to the same data gram, and the two consecutive transmission units are reassembled based on respective sequence numbers to recover the datagram.

In some embodiments, when the index numbers of two consecutive transmission units are the same but the sequence numbers of the two consecutive transmission units are non-continuous, the two consecutive transmission units are determined as to whether the units belong to different datagrams.

Embodiments described herein further provide a network device for fragmenting and reassembling data frames on a MAC layer in a wireless local area network. The device includes a buffer, a transmitter and processing circuitry. The buffer is configured to receive, from an application run by the processing circuitry, a datagram for transmission over a wireless communication link in the wireless local area network. The processing circuitry configured to initiate a negotiation request with a second network device for determining whether both the first network device and the second network device have enhanced directional multi-gigabit (EDMG) capability for data segmentation and reassembly and determine whether a size of the datagram exceeds a maximum size defined by a wireless local area network transmission protocol. When the size of the datagram exceeds the maximum size defined by the wireless local area network transmission protocol, and both the first network device and the second network device have EDMG capability for data segmentation and reassembly, the processing circuitry is configured to segment the datagram into a plurality of transmission data units on the MAC layer, and assign identifying information to a respective data field in each transmission data unit from the plurality of transmission data units. The transceiver is configured to transmit, via the wireless communication link in the wireless local area network, the plurality of transmission data units to the second network device.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for segmentation and reassembly of data frames in 802.11 wireless local area networks (WLANs).

In 802.11 WLANs, as the maximum size of an MSDU is usually limited, large application datagrams cannot fit into a single MSDU, and often require to be segmented in order to form an MSDU for transmission. Thus, the large datagrams are usually fragmented into multiple smaller datagrams for transmission as MSDUs. The MSDUs containing the fragmented datagrams are then reassembled at the destination to recover the original large datagram. Conventionally, the fragmentation and reassembly of the datagrams are conducted at an upper layer, e.g., the IP layer or even the application layer implemented by the host software. For example, an 802.11 wireless network device, such as but not limited to a laptop computer, a Smartphone, a tablet computer, and/or the like, may fragment a large multimedia datagram into smaller pieces of multimedia data, and send the smaller pieces to another 802.11 wireless network device, which may in turn assemble the smaller pieces of multimedia data through the application layer to reconstruct the original multimedia datagram. Performing the fragmentation and reassembly of datagrams at the host processor may require a significant amount of processing efforts and hardware resources. Embodiments described herein provide various segmentation solutions of large datagrams at the MAC layer, instead of at an upper layer. By conducting segmentation at the MAC layer, no signification computational tasks are incurred to the host processor running the application that originates the datagrams, and thus processing cost and hardware resource consumption can be reduced.

Figure 1:
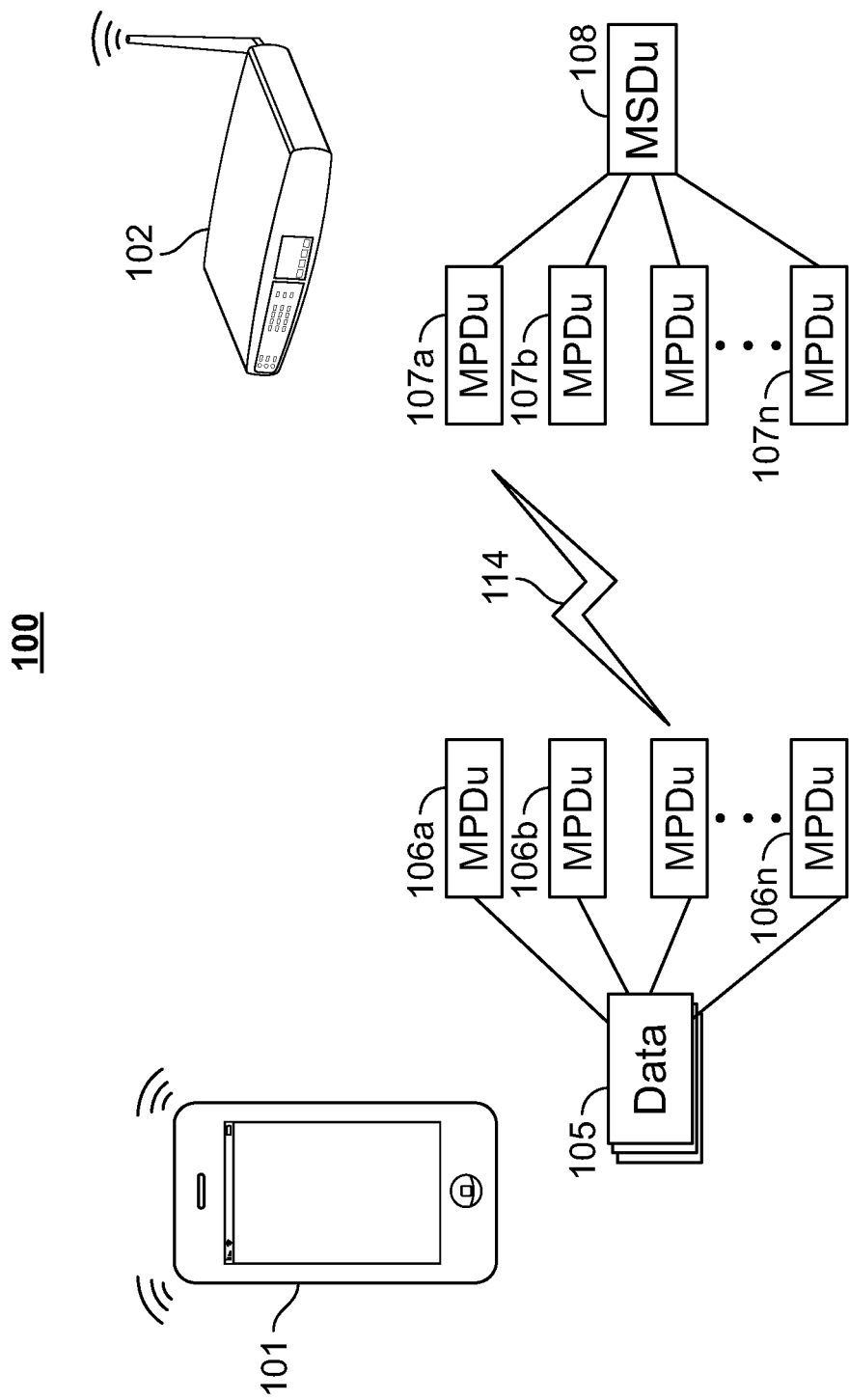
FIG. 1 shows an example block diagram illustrating transmitting large datagram via MSDU segmentation over a wireless connection, according to embodiments described herein.

FIG. 1 shows an example block diagram 100 illustrating transmitting large datagram via MSDU segmentation over a wireless connection, according to embodiments described herein. Diagram 100 shows two 802.11ad devices 101 and 102, which may communicate via the wireless link 114. For example, device 101 may transmit one or more datagrams generated by applications running on device 101 to device 102. When the datagram has a large size, e.g., greater than the maximum size of 7920 bytes for an MSDU, the datagram may be segmented into smaller pieces. In some embodiments, as further illustrated in FIGS. 3-6, the datagram 105 (e.g., the data frame that is intended to be transmitted as an MSDU) may be segmented and formed into multiple segmented MSDUs 106a-n, which are transmitted via the wireless connection 114. Each segmented MSDUs 106a-n may be assigned a unique identifier, such as a sequence or fragmentation number. Thus, device 102 may receive the segmented MSDUs 107a-n from the wireless connection 114, and reassemble the segmented MSDUs into MSDU 108, e.g., based on the unique identifier associated with each segmented MSDU 108a-n, as further described in FIGS. 3 and 5.

To reduce processing overhead at the application layer, the segmentation and reassembly of the segmented MSDUs 106a-n or 107a-n are performed at the MAC layer. In order to perform MSDU segmentation at the MAC layer, the segmentation initiator and responder, e.g., devices 101 and 102, may negotiate the MSDU segmentation capability before commencing data transmission, e.g., whether both devices 101 and 102 are 802.11ay enhanced directional multi-gigabit (EDMG) stations that support MSDU segmentation and reassembly. For example, a data bit in EDMG Capability Element from device 101 may indicate whether such capability is implemented.

After the negotiation, devices 101 and 102 may maintain a data tuple <Source MAC address, Destination MAC address, TID> in each segmented MSDU, wherein TID is the traffic identifier indicating which type of Quality of Service (QoS) the data traffic requires. In some implementations, the negotiation process may be performed during a block acknowledgement session. For example, device 101, the initiator may send a transmission request including one data bit indicating whether MSDU segmentation and reassembly is supported, and the responder, device 102 may in turn send a block acknowledgement message indicating whether EDMG is supported at device 102.

Figure 2:
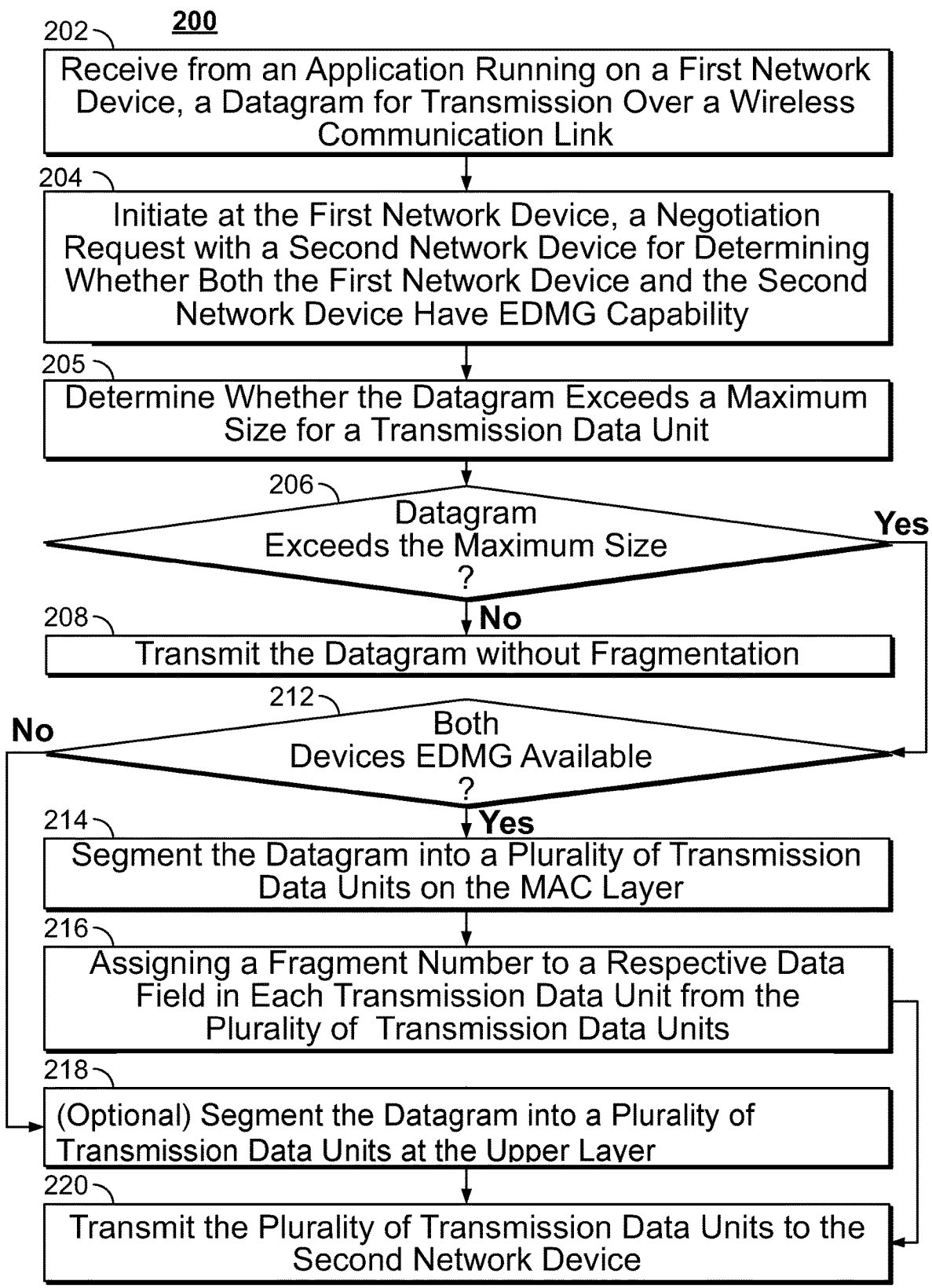
FIG. 2 shows an example logic diagram illustrating transmitting large datagram via MSDU segmentation over a wireless connection, according to embodiments described herein.

FIG. 2 shows an example logic diagram 200 illustrating transmitting large datagram via MSDU segmentation over a wireless connection, according to embodiments described herein. At 202, an initiator (e.g., a first network device 101 in FIG. 1) is configured to receive, e.g., at a buffer, from an application running on a first network device, a datagram for transmission over a wireless communication link. For example, the initiator is configured to transmit a data packet of media data from a media player application. At 204, the initiator is configured to initiate a negotiation request with a second network device (e.g., a responder, see device 102 in FIG. 1) for determining whether both the initiator and the responder have MSDU segmentation and reassembly capability. For example, the initiator is configured to send an association request to the responder, in which a designated data bit indicates whether such function is implemented at the initiator. In response to the association request, the responder is configured to send an acknowledgement message, in which a similar data bit indicates whether EDMG MSDU segmentation and reassembly is supported at the responder. The negotiation is sometimes implemented during a block acknowledgement session between the initiator and the responder. In some implementations, the negotiation between the first network device and the second network device may be performed periodically, intermittently and/or constantly to update the capability status with the devices. At 205, the initiator is configured to determine whether the datagram exceeds a maximum size for a MSDU. For example, the maximum size for transmitting data as MSDU is 7920 bytes for 802.11ad devices. At 206, when the datagram does not exceed the maximum size for the transmission data unit, process 200 proceeds to 208, where the initiator transmits the datagram without fragmentation.

At 206, when the datagram exceeds the maximum size for the transmission data unit, process 200 proceeds to 212, to determine whether both the first network device (the initiator) and the second network device (the responder) have EDMG MSDU segmentation and reassembly capability (as described at 204). When both the first network device (the initiator) and the second network device (the responder) have EDMG MSDU segmentation and reassembly capability, process 200 proceeds to 214, where the initiator is configured to segment the datagram into a plurality of transmission data units on the MAC layer. For example, each transmission data unit is a segmented MSDU having a size less than 7920 bytes. At 216, the initiator is configured to assign a fragment number to a respective sequence control field in each transmission data unit from the plurality of transmission data units, and then at 220, the initiator is configured to transmit the plurality of transmission data units to the second network device (the responder). Further detail relating to the segmentation on the MAC layer is discussed in FIGS. 3-6.

At 212, when not both of the first network device (the initiator) and the second network device (the responder) have EDMG MSDU segmentation and reassembly capability, process 200 may optionally proceed to 218. For example, at 218, the initiator is configured to optionally segment the datagram into a plurality of transmission data units at the upper layer, e.g., by the application running on the initiator device, and then send the transmission data units to the second network device at 220.

Figure 3:
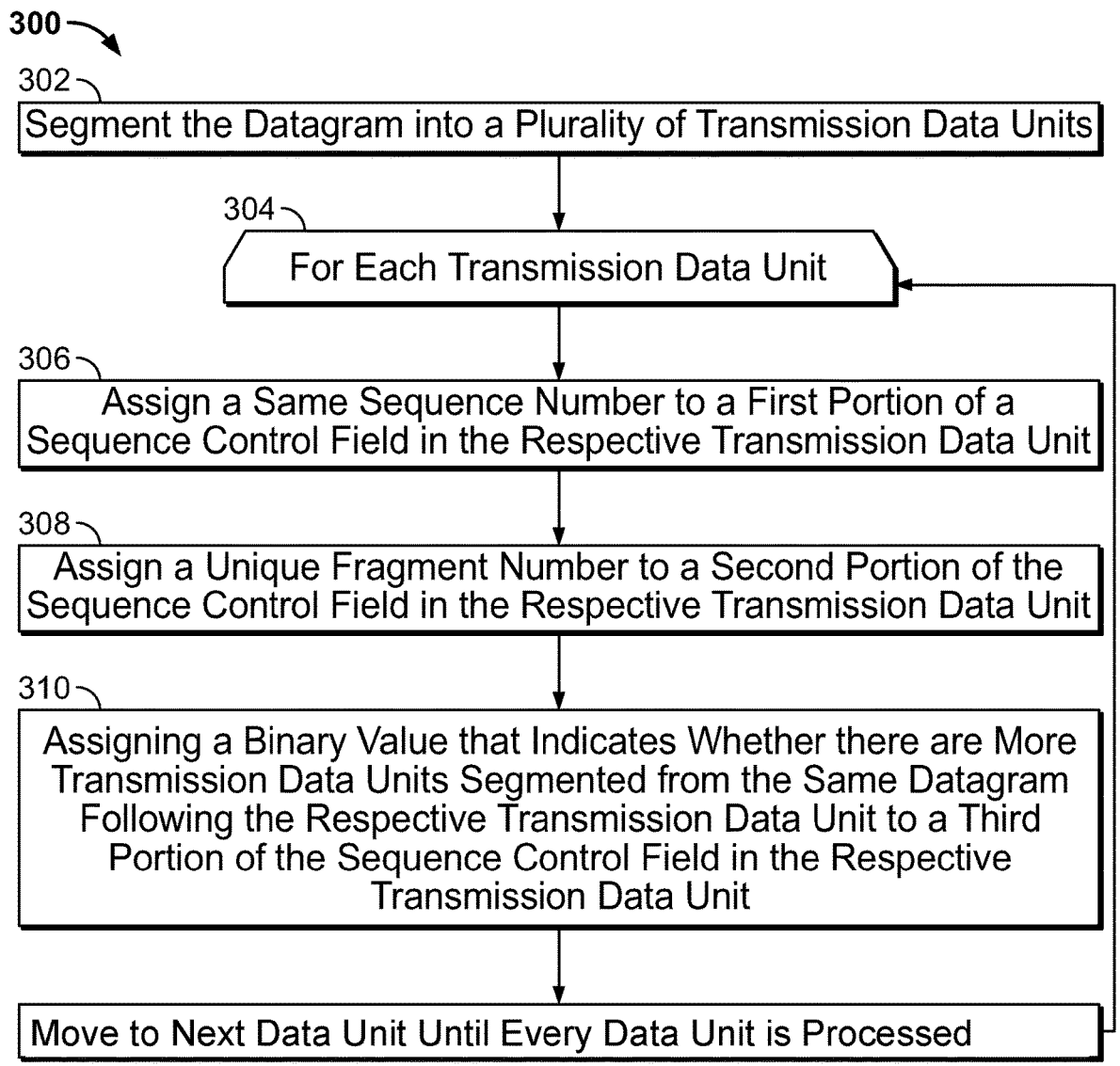
FIG. 3 shows an example logic diagram illustrating segmenting the datagram into a plurality of transmission data units on the MAC layer by reusing legacy fragmentation, according to embodiments described herein.

FIG. 3 shows an example logic diagram 300 illustrating segmenting the datagram into a plurality of transmission data units on the MAC layer by reusing legacy fragmentation, according to embodiments described herein. At 302, the initiator is configured to segment the datagram (e.g., a larger MSDU) into a plurality of transmission data units, e.g., into multiple segmented MSDU units having a size smaller than 7920 bytes. At 304, for each transmission data unit (e.g., segmented MSDU) segmented from the same datagram, the initiator is configured to reuse a sequence control field defined in a legacy protocol (e.g., 802.11b/g), and assign a same sequence number to a first portion of a sequence control field in the respective transmission data unit at 306, and assign a unique fragment number to a second portion of the sequence control field in the respective transmission data unit at 308. For example, the initiator is configured to reuse a sequence control field defined in legacy fragmentation. For example, in 802.11b/g when the transmission data rate is relatively low, data frames are sometimes segmented into smaller sizes for transmission. Thus, the legacy sequence control field contained in each segmented MSDU can be reused, which includes the first four bits (e.g., B0-B3) designated for a fragment number corresponding to the segmented MSDU, and the next 12 bits (e.g., B4-B15) designated for a sequence number corresponding to the segmented MSDU. Specifically, the segmented MSDUs that belong to the same datagram (e.g., a larger MSDU) are assigned the same sequence number, and each segmented MSDU is assigned a three-bit fragment number indicating the index number of the respective segmented MSDU corresponding to the larger MSDU. Therefore, the resulting segmented MSDUs can include a maximum of 8×7920 bytes.

At 310, the initiator is configured to assign a binary value to a third portion of the sequence control field in the respective transmission data unit, and the binary value indicates whether there are more transmission data units segmented from the same datagram following the respective transmission data unit. For example, one data bit in the fragment number portion in the sequence control field is designated to represent that the subsequent segmented MSDU(s) belongs to the same larger MSDU with the current segmented MSDU when the data bit equals one. Or the subsequent segmented MSDU does not belong to the same larger MSDU when the data bit equals zero, meaning the current segmented MSDU is the last fragmented segmented MSDU in the larger MSDU.

The initiator is configured to repeat 306-310 for each transmission data unit, and process 300 continues with 304 to repeat 306-310 for more transmission data units.

Figure 4:
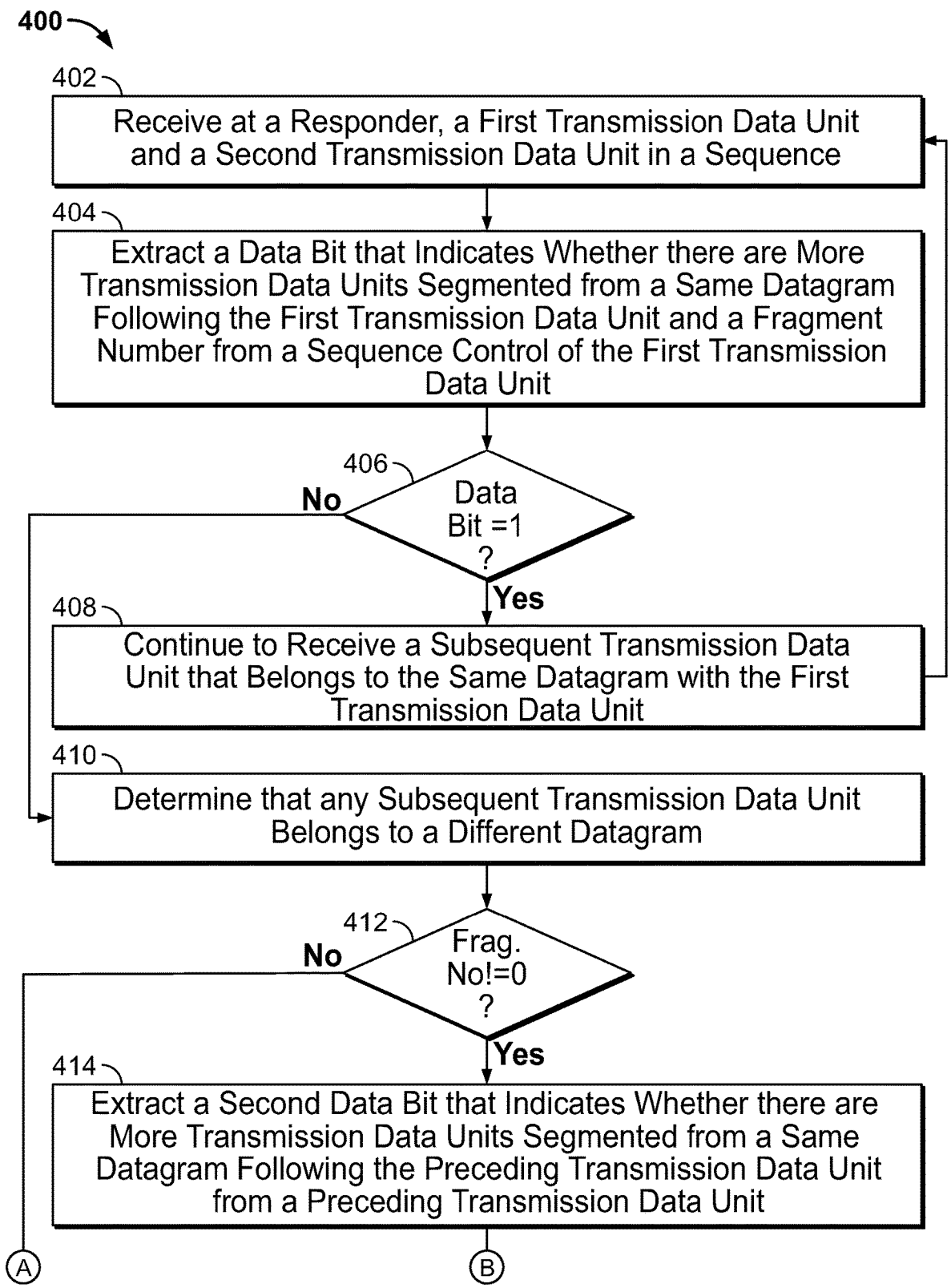
FIG. 4 shows an example logic diagram illustrating receiving and reassembling transmission data units fragmented via the process 300 described in FIG. 3, according to embodiments described herein.
Figure 4:
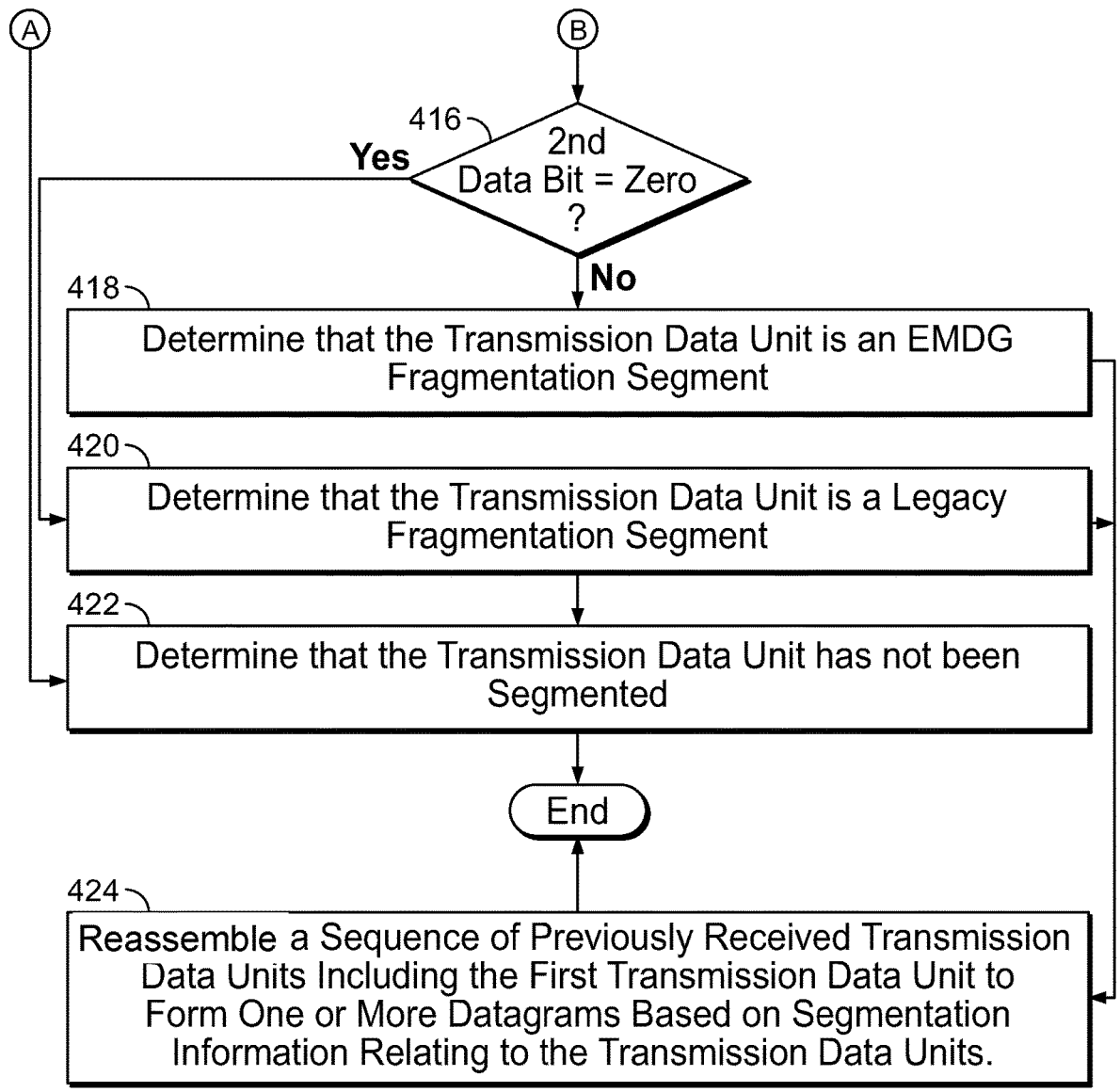

FIG. 4 shows an example logic diagram 400 illustrating receiving and reassembling transmission data units fragmented via the process 300 described in FIG. 3, according to embodiments described herein. At 402, a responder (e.g., network device 102 in FIG. 1) is configured to receive a first transmission data unit, e.g., a segmented MSDU. At 404, the responder is configured to extract a data bit and a fragment number from a sequence control field of the first transmission data unit, and the data bit indicates whether there are more transmission data units segmented from a same datagram following the first transmission data unit. For example, the responder is configured to extract the first four bits B0-B3 of the sequence control field. At 406, when the data bit equals one, process 400 continues to 408, where the responder is configured to determine that a subsequent transmission data unit belongs to the same datagram with the transmission data unit. The responder is then configured to continue receiving the subsequent segmented MSDU, e.g., process 400 proceeds to 402.

At 406, when the data bit equals zero, process 400 continues to 410, where the responder is configured to determine that any subsequent transmission data unit belongs to a different datagram, e.g., the current transmission data unit (segmented MSDU) is the last segmented MSDU in the fragmented datagram. At 412, the responder is configured to retrieve the three-bit fragment number of the transmission data unit, and when the fragmentation number is non-zero, process 400 proceeds to 414, where the responder is configured to extract another data bit of the sequence control field from a preceding transmission data unit, and the data bit indicates whether any subsequent transmission data unit after the preceding transmission data unit belongs to the same datagram. At 416, when the second data bit equals zero, the responder is configured to determine that the transmission data unit is an EDMG fragmentation segment. At 416, when the second data bit equals one, the responder is configured to determine that the transmission data unit is a legacy fragmentation segment. At 424, the responder is then configured to reassemble received transmission data units to form one or more datagrams based on segmentation information relating to the transmission data units, e.g., based on whether the transmission units are EDMG segments or legacy segments. For example, when the transmission units are EDMG segments, the responder is configured to extract the fragment numbers of each transmission unit and assemble the transmission units based on the fragment numbers.

At 412, when the fragment number is zero, process 400 continues with 422, where the responder is configured to determine that the transmission data unit has not been segmented, e.g., the received segmented MSDU is an independent frame that does not need to be reassembled with other segmented MSDUs.

Figure 5:
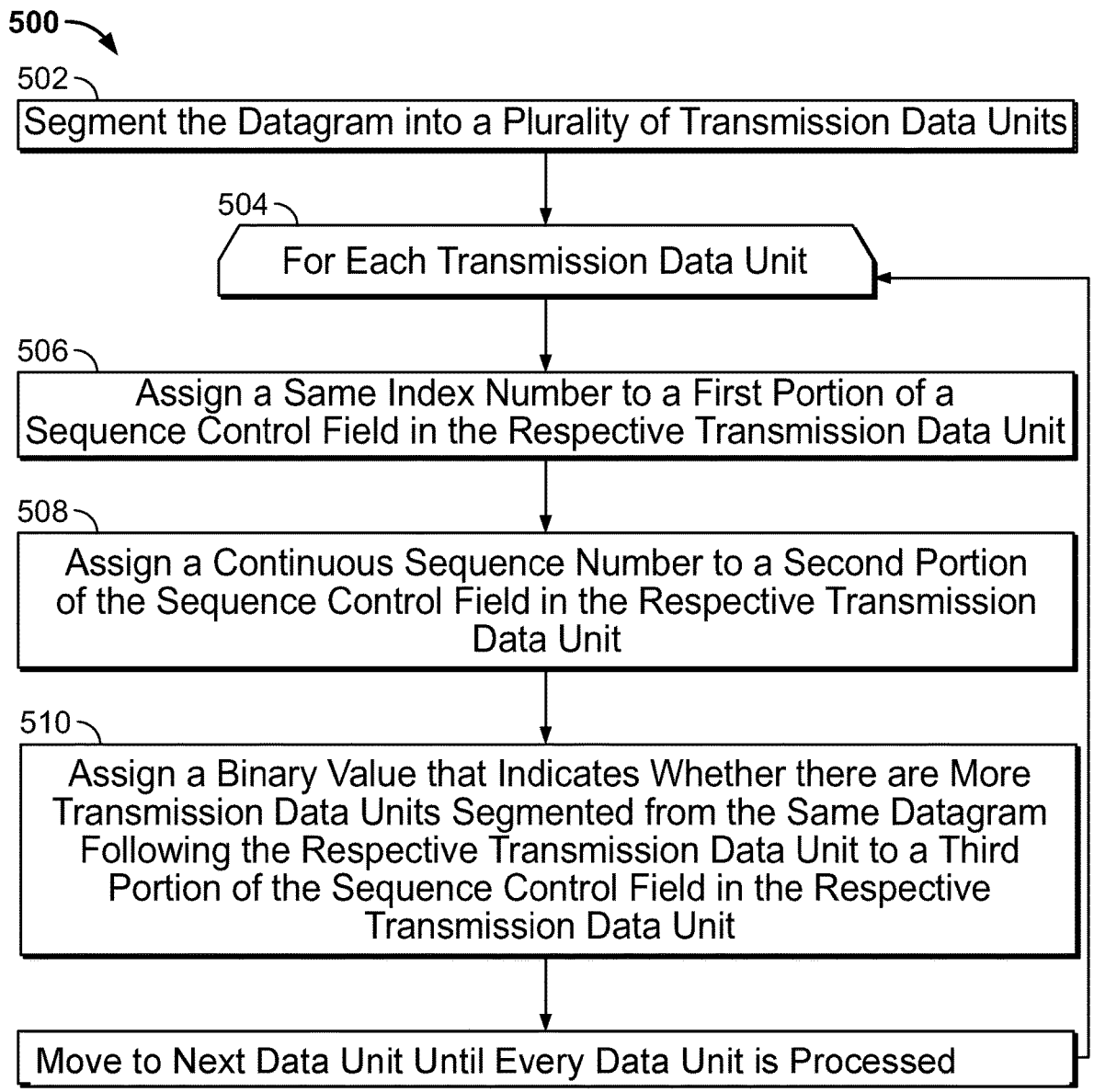
FIG. 5 shows an example logic diagram illustrating segmenting the datagram into a plurality of transmission data units on the MAC layer by redefining fragmentation number as MSDU index number, according to embodiments described herein.

FIG. 5 shows an example logic diagram 500 illustrating segmenting the datagram into a plurality of transmission data units on the MAC layer by redefining fragmentation number as MSDU index number, according to embodiments described herein. At 502, the initiator (e.g., network device 101 in FIG. 1) is configured to segment the datagram (e.g., a larger MSDU) into a plurality of transmission data units (e.g., segmented MSDUs). For each transmission data unit at 504, process 500 proceeds to 506, where the initiator is configured to assign the same index number to a first portion of a sequence control field in the respective transmission data unit at 506, and assign a continuous sequence number to a second portion of the sequence control field in the respective transmission data unit at 508. For example, under the fragmentation process 500, the first four bits of the sequence control field are used to represent an index number corresponding to the larger MSDU. In some embodiments, three bits are used for MSDU index number 0-7 and one bit is used to represent whether the subsequent segmented MSDU belongs to the same MSDU. For example, at 510, the initiator is configured to assign a binary value to a third portion of the sequence control field in the respective transmission data unit, and the binary value indicates whether there are more transmission data units segmented from the same datagram following the respective transmission data unit. In some embodiments, four bits are used for MSDU index number 0-16. Thus, segmented MSDUs with continuous sequence numbers and the same MSDU index number are fragments from the same larger MSDU (datagram).

Under the fragmentation process 500, legacy segmentation is not allowed, and the tuple information <Source MAC address, Destination MAC address, TID> and one data bit designated for indicating whether subsequent segmented MSDU belong to the same datagram with the current segmented MSDU are sometimes used to provide information for fragmentation on the MAC layer. Process 500 then repeats 506-510 to process each segmented MSDU.

Figure 6:
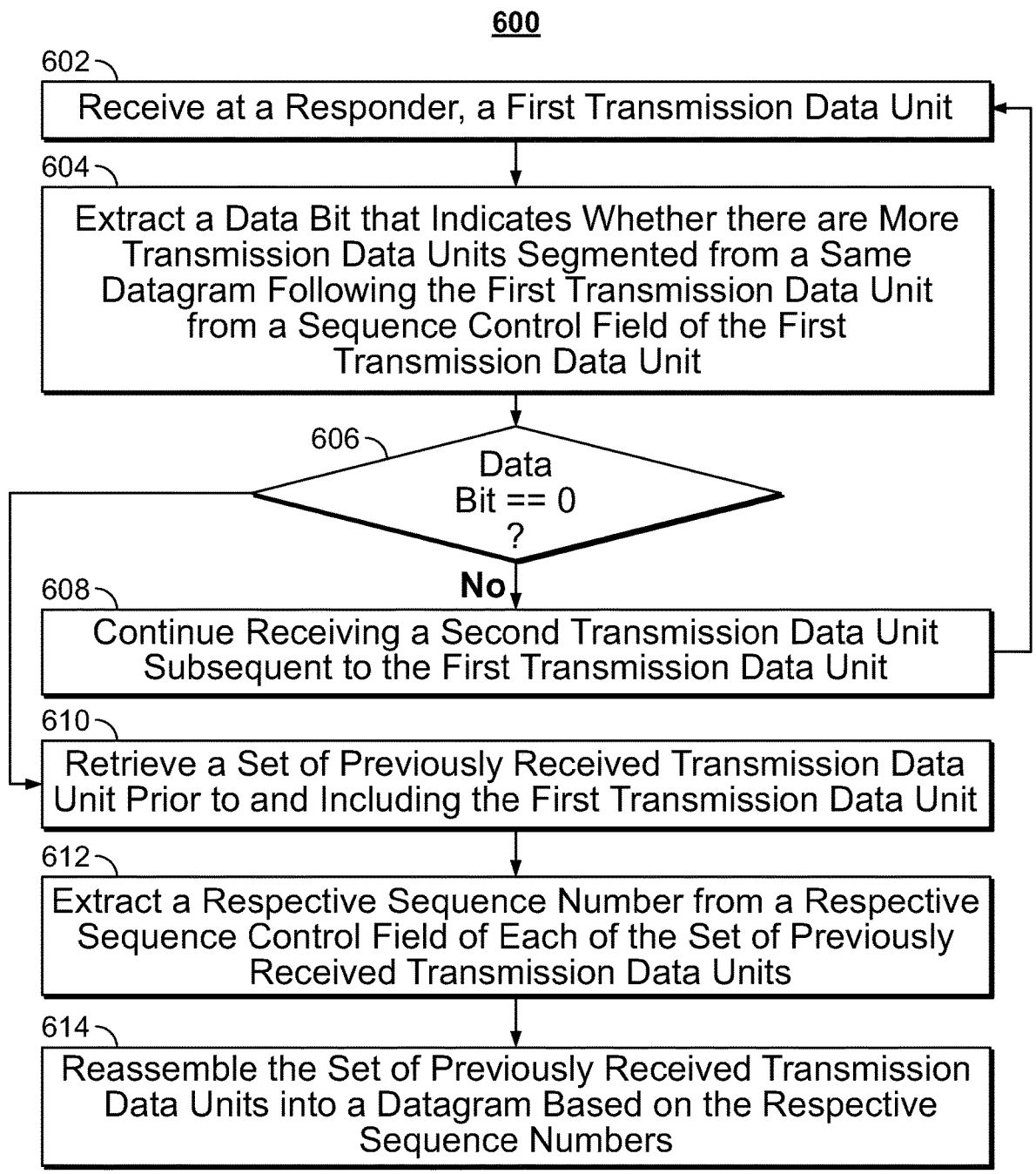
FIG. 6 shows an example logic diagram illustrating receiving and reassembling a plurality of transmission data units fragmented via the process described in FIG. 5, according to embodiments described herein.

FIG. 6 shows an example logic diagram 600 illustrating receiving and reassembling a plurality of transmission data units fragmented via the process 500 described in FIG. 5, according to embodiments described herein. At 602, the responder is configured to receive a first transmission data unit. At 604, the responder is configured to extract a data bit that indicates whether there are more transmission data units segmented from a same datagram following the first transmission data unit from a sequence control field of the first transmission data unit, wherein the data bit. De-fragmentation of segmented MSDUs at the responder is to be implemented at an end of an MSDU. At 606, when the data bit equals one, the responder is configured to continue receiving a second transmission data unit subsequent to the first transmission data unit at 608. And then process 600 continues to 602, until the data bit of the respective segmented MSDU indicates that the end of the MSDU has been reached and no more subsequent segmented MSDUs belong to the same segmented MSDU with the respective segmented MSDU.

At 606, when the data bit equals zero, the responder is configured to retrieve a set of previously received transmission data unit prior to and including the first transmission data unit for de-fragmentation at 610, and all the set of previously received transmission data units have the same MSDU index number. At 612, the responder is configured to extract a respective sequence number from a respective sequence control field of each of the set of previously received transmission data units, and then reassemble the set of previously received transmission data units into a datagram based on the respective sequence numbers.

Figure 7:
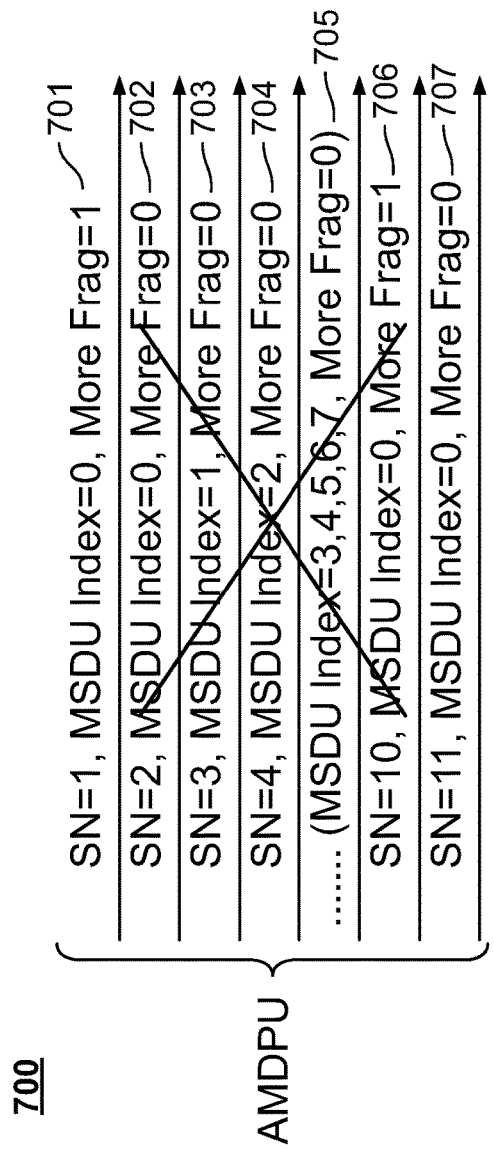
FIGS. 7-8 show example block diagrams illustrating reception behaviors of segmented MSDUs based on the reassembly process 600 described in FIG. 6, according to embodiments described herein.
Figure 8:
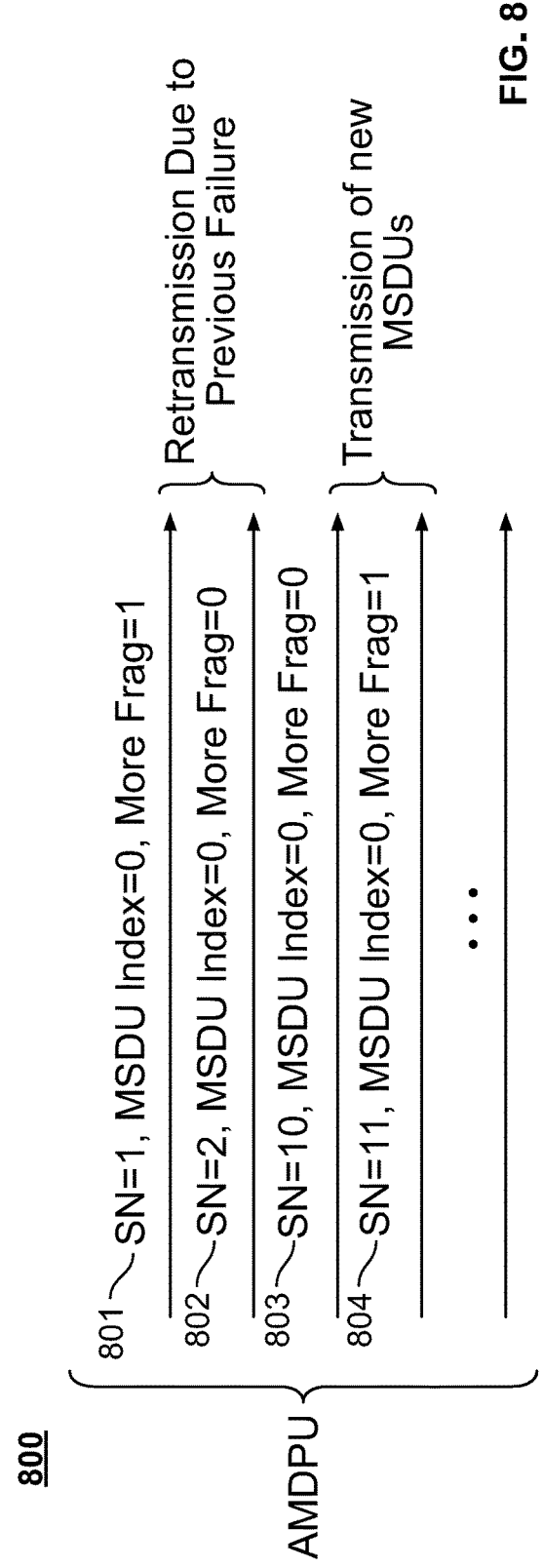

FIGS. 7-8 show example block diagrams 700 and 800 illustrating reception behaviors of segmented MSDUs based on the reassembly process 600 described in FIG. 6, according to embodiments described herein. When two consecutively-received segmented MSDUs have the same MSDU index number but non-continuous sequence number, these two segmented MSDUs are not regarded as part of the same MSDU. For example, as shown in diagram 700, segmented MSDU 701 has a "More Fragment" data bit equals one, and the MSDU indices of both segmented MSDUs 701 and 702 are the same, meaning the subsequent segmented MSDU 702 belongs to the same MSDU with segmented MSDU 701. For segmented MSDUs 702-705, where the MSDU indices increases from 0-7, and the "More Fragment" data bit equals zero, meaning each segmented MSDU 702-705 does not belong to the same MSDU. However, at segmented MSDU 706, as the three-bit MSDU index has reached its maximum of "7," the MSDU index changes to "0." Thus for segmented MSDUs 701, 702, 706 and 707 which all have the same MSDU index number "0," but the sequence numbers are not continuous, these four segmented MSDUs are not to be reassembled as the same MSDU, but instead, all segmented MSDUs from 702-706 are corrupted as an error has been identified. Therefore, the MSDU index range is sometimes preferred to be as large as possible (e.g., three-bit or four-bit MSDU index number to support a broader range of MSDU index values).

At diagram 800 in FIG. 8, segmented MSDUs 801 and 802 are transmitted segmented MSDUs due to previous failure. Thus segmented MSDUs 801 and 802 have the same MSDU index of "0," and continuous sequence numbers "1" and "2," respectively. At segmented MSDU 803, although segmented MSDU 803 has the same MSDU index number of "0," but due to the non-continuous sequence number of "10," segmented MSDU 803 does not belong to the same MSDU with segmented MSDU 802 or 801. Instead, segmented MSDU 803 and any subsequent segmented MSDU 804 are treated as transmission of new segmented MSDUs.

Various embodiments discussed in conjunction with FIGS. 1-8 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., 101-102 in FIG. 1), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for fragmenting and reassembling data frames on a medium access control (MAC) layer in a wireless local area network, the method comprising:
   receiving, from an application running on a first network device, a datagram for transmission over a wireless communication link in the wireless local area network;
   initiating, at the first network device, a negotiation request with a second network device for determining whether both the first network device and the second network device have enhanced directional multi-gigabit capability (EDMG) for data segmentation and reassembly;
determining whether a size of the datagram exceeds a maximum size defined by a wireless local area network transmission protocol;
when the size of the datagram exceeds the maximum size defined by the wireless local area network transmission protocol and
both the first network device and the second network device have EDMG capability for data segmentation and reassembly:
segmenting the datagram into a plurality of transmission data units on the MAC layer, and
assigning identifying information to a respective sequence control field in each transmission data unit from the plurality of transmission data units, wherein the assigning comprises:
for a first transmission data unit from the plurality of transmission data units, which first transmission data unit does not follow a respective previous transmission data unit, assigning an index number to a first portion of a sequence control field in the first transmission data unit, and assigning a sequence number to a second portion of the sequence control field in the first transmission data unit,
for each respective transmission data unit, from the plurality of transmission data units, that is not the first transmission data unit:
when the respective transmission data unit is segmented from a same datagram as an immediately preceding transmission data unit, assigning a same index number to the first portion of the sequence control field of the respective transmission data unit as in the first portion of the sequence control field of the immediately preceding transmission data unit, and assigning a sequence number to the second portion of the sequence control field of the respective transmission data unit that is continuous relative to the sequence number in the second portion of the sequence control field of the immediately preceding transmission data unit, and
when the respective transmission data unit is segmented from a different datagram than the immediately preceding transmission data unit, assigning the same index number to the first portion of the sequence control field in the respective transmission data unit, and assigning a sequence number to the second portion of the sequence control field of the respective transmission data unit that is non-continuous relative to the sequence number in the second portion of the sequence control field of the immediately preceding transmission data unit; and
transmitting, via the wireless communication link in the wireless local area network, the plurality of transmission data units to the second network device.

2. The method of claim 1, wherein the segmenting the datagram into a plurality of transmission data units on the MAC layer comprises:
segmenting the datagram into fragmented data units, wherein each fragmented data unit has a size smaller than the maximum size defined by a wireless local area network transmission protocol.

3. The method of claim 1, wherein the assigning identifying information to a respective data field in each transmission data unit from the plurality of transmission data units further comprises:
when each transmission data unit that belongs to the plurality of transmission data units segmented from the same datagram:
assigning a unique fragment number to the second portion of the sequence control field in the respective transmission data unit, wherein the unique fragment number represents a respective index for the respective transmission data unit in the plurality of transmission data units segmented from the same datagram; and
assigning a binary value that indicates whether there are more transmission data units segmented from the same datagram following the respective transmission data unit to a third portion of the sequence control field in the respective transmission data unit.

4. The method of claim 3, further comprising:
reusing a legacy sequence control field defined in a legacy wireless local area network transmission protocol as the sequence control field;
designating first three bits of the sequence control field for the unique fragment number;
designating a fourth bit of the sequence control field for the binary value that indicates whether there are more transmission data units segmented from the same datagram following the respective transmission data unit; and
designating remaining 12 bits of the sequence control field for the sequence number,
wherein transmission data units with a same sequence number belong to the same datagram.

5. The method of claim 3, further comprising:
receiving, at the first network device, a respective transmission data unit;
extracting a first data bit that indicates whether there are more transmission data units segmented from a same datagram following the respective transmission data unit and a first fragment number from a first sequence control field of the respective transmission data unit;
when the data bit equals one, continuing to receive a subsequent transmission data unit that belongs to the same datagram as the respective transmission data unit;
when the data bit equals zero:
determining that any subsequent transmission data unit belongs to a different datagram;
determining whether the first fragment number equals zero;
when the first fragment number is non-zero:
extracting a second data bit that indicates whether there are more transmission data units segmented from a same datagram as a preceding transmission data unit;
when the second data bit equals one, determining that the transmission data unit is an EDMG fragmentation segment;
when the second data bit equals zero, determining that the transmission data unit is a legacy fragmentation segment;
when the first fragment number is zero, determining that the transmission data unit has not been segmented;
reassembling a sequence of previously received transmission data units including the respective transmission data unit to form one or more datagrams based on segmentation information relating to the transmission data units.

6. The method of claim 1, wherein the assigning identifying information to a respective data field in each transmission data unit from the plurality of transmission data units further comprises:
for each transmission data unit that belong to the plurality of transmission data units segmented from the same datagram:
assigning a binary value that indicates whether there are more transmission data units segmented from the same datagram following the respective transmission data unit to a third portion of the sequence control field in the respective transmission data unit.

7. The method of claim 6, further comprising:
re-defining a legacy sequence control field used in a legacy wireless local area network transmission protocol as the sequence control field;
designating first three bits of the sequence control field for the index number;
designating fourth bit of the sequence control field for the binary value that indicates whether there are more transmission data units segmented from the same datagram following the respective transmission data unit; and
designating remaining 12 bits of the sequence control field for the continuous sequence number,
wherein transmission data units with the same index number and continuous sequence numbers belong to the same datagram.

8. The method of claim 6, further comprising, at the second network device:
receiving a respective transmission data unit from among the plurality of the transmission data units;
extracting a first data bit that indicates whether there are more transmission data units segmented from a same datagram following the respective transmission data unit from a first sequence control field of the respective transmission data unit;
when the first data bit equals one, continuing receiving a second transmission data unit subsequent to the first transmission data unit;
when the first data bit equals zero:
retrieving a set of previously received transmission data units prior to and including the respective transmission data unit; and
extracting a respective index number and a respective sequence number from a respective sequence control field of each of the set of previously received transmission data units.

9. The method of claim 8, further comprising, at the second network device:
extracting a first index number and a first sequence number from the from the first sequence control field of the respective transmission data unit;
extracting a second index number and a second sequence number from a second sequence control field of the second transmission data unit;
determining whether index numbers of two consecutive transmission units are the same;
when the index numbers of two consecutive transmission units are the same, determining whether sequence numbers of the two consecutive transmission units are continuous;
when the sequence numbers of the two consecutive transmission units are continuous, determining that the two consecutive transmission units belong to the same datagram, and
reassembling the two consecutive transmission units based on respective sequence numbers to recover the datagram.

10. The method of claim 9, further comprising, at the second network device:
when the index numbers of two consecutive transmission units are the same but the sequence numbers of the two consecutive transmission units are non-continuous, determining that the two consecutive transmission units belong to different datagrams.

11. A network device for fragmenting and reassembling data frames on a medium access control (MAC) layer in a wireless local area network, the device comprising:
a buffer configured to receive, from an application run by a processing circuitry at a first network device, a datagram for transmission over a wireless communication link in the wireless local area network;
the processing circuitry configured to:
initiate a negotiation request with a second network device for determining whether both the first network device and the second network device have enhanced directional multi-gigabit (EDMG) capability for data segmentation and reassembly;
determine whether a size of the datagram exceeds a maximum size defined by a wireless local area network transmission protocol;
when the size of the datagram exceeds the maximum size defined by the wireless local area network transmission protocol and both the first network device and the second network device have EDMG capability for data segmentation and reassembly:
segment the datagram into a plurality of transmission data units on the MAC layer, and
assign identifying information to a respective data field in each transmission data unit from the plurality of transmission data units; by:
for a first transmission data unit from the plurality of transmission data units, which first transmission data unit does not follow a respective previous transmission data unit, assigning an index number to a first portion of a sequence control field in the first transmission data unit, and assigning a sequence number to a second portion of the sequence control field in the first transmission data unit,
for each respective transmission data unit, from the plurality of transmission data units, that is not the first transmission data unit:
when the respective transmission data unit is segmented from a same datagram as an immediately preceding transmission data unit, assigning a same index number to the first portion of the sequence control field of the respective transmission data unit as in the first portion of the sequence control field of the immediately preceding transmission data unit, and assigning a sequence number to the second portion of the sequence control field of the respective transmission data unit that is continuous relative to the sequence number in the second portion of the sequence control field of the immediately preceding transmission data unit, and when the respective transmission data unit is segmented from a different datagram than the immediately preceding transmission data unit, assigning the same index number to the first portion of the sequence control field in the respective transmission data unit, and assigning a sequence number to the second portion of the sequence control field of the respective transmission data unit that is non-continuous relative to the sequence number in the second portion of the sequence control field of the immediately preceding transmission data unit and a transceiver configured to:
transmit, via the wireless communication link in the wireless local area network, the plurality of transmission data units to the second network device.

12. The system of claim 11, wherein the processor, when segmenting the datagram into a plurality of transmission data units on the MAC layer, is further configured to:
segment the datagram into fragmented data units, wherein each fragmented data unit has a size smaller than the maximum size defined by a wireless local area network transmission protocol.

13. The system of claim 11, wherein the processor, when assigning identifying information to a respective data field in each transmission data unit from the plurality of transmission data units, is further configured to:
for each transmission data unit that belong to the plurality of transmission data units segmented from the same datagram:
assign the same sequence number to the first portion of the sequence control field in the respective transmission data unit;
assign a unique fragment number to the second portion of the sequence control field in the respective transmission data unit, wherein the unique fragment number represents a respective index for the respective transmission data unit in the plurality of transmission data units segmented from the same datagram; and
assign a binary value that indicates whether there are more transmission data units segmented from the same datagram following the respective transmission data unit to a third portion of the sequence control field in the respective transmission data unit.

14. The system of claim 13, wherein the processor is further configured to:
reuse a legacy sequence control field defined in a legacy wireless local area network transmission protocol as the sequence control field;
designate first three bits of the sequence control field for the unique fragment number;
designate fourth bit of the sequence control field for the binary value that indicates whether there are more transmission data units segmented from the same datagram following the respective transmission data unit; and
designate remaining 12 bits of the sequence control field for the sequence number,
wherein transmission data units with a same sequence number belong to the same datagram.

15. The system of claim 13, wherein the transceiver is further configured to receive a respective transmission data unit, and wherein the processor is further configured to:
extract a first data bit that indicates whether there are more transmission data units segmented from a same datagram following the respective transmission data unit and a first fragment number from a first sequence control field of the respective transmission data unit;
when the data bit equals one, continuing to receive a subsequent transmission data unit that belongs to the same datagram with the respective transmission data unit;
when the data bit equals zero:
determine that any subsequent transmission data unit belongs to a different datagram;
determine whether the first fragment number equals zero;
when the first fragment number is non-zero:
extract a second data bit that indicates whether there are more transmission data units segmented from a same datagram as a preceding transmission data unit;
when the second data bit equals one, determine that the transmission data unit is an EDMG fragmentation segment;
when the second data bit equals zero, determine that the transmission data unit is a legacy fragmentation segment;
when the first fragment number is zero, determine that the transmission data unit has not been segmented;
reassemble a sequence of previously received transmission data units including the respective transmission data unit to form one or more datagrams based on segmentation information relating to the transmission data units.

16. The system of claim 11, wherein the processor, when assigning identifying information to a respective data field in each transmission data unit from the plurality of transmission data units, is further configured to:
for each transmission data unit that belong to the plurality of transmission data units segmented from the same datagram:
assign a binary value that indicates whether there are more transmission data units segmented from the same datagram following the respective transmission data unit to a third portion of the sequence control field in the respective transmission data unit.

17. The system of claim 16, wherein the processor is further configured to:
re-define a legacy sequence control field used in a legacy wireless local area network transmission protocol as the sequence control field;
designate first three bits of the sequence control field for the index number;
designate fourth bit of the sequence control field for the binary value that indicates whether there are more transmission data units segmented from the same datagram following the respective transmission data unit; and
designate remaining 12 bits of the sequence control field for the continuous sequence number,
wherein transmission data units with the same index number and continuous sequence numbers belong to the same datagram.

18. The system of claim 16, wherein the transceiver is further configured to receive at the second network device, a respective transmission data unit from among a plurality of the transmission data units, and wherein the processor is further configured to:
extract a first data bit that indicates whether there are more transmission data units segmented from a same datagram following the respective transmission data unit from a first sequence control field of the respective transmission data unit;

when the first data bit equals one, continue receiving a second transmission data unit subsequent to the respective transmission data unit;

when the first data bit equals zero:
- retrieve a set of previously received transmission data units prior to and including the respective transmission data unit; and
- extract a respective index number and a respective sequence number from a respective sequence control field of each of the set of previously received transmission data units.

19. The system of claim 18, wherein the processor is further configured to:
- extract a first index number and a first sequence number from the respective sequence control field of the first transmission data unit;
- extract a second index number and a second sequence number from a second sequence control field of the second transmission data unit;
- determine whether index numbers of two consecutive transmission units are the same;
- when the index numbers of two consecutive transmission units are the same, determine whether sequence numbers of the two consecutive transmission units are continuous;
- when the sequence numbers of the two consecutive transmission units are continuous, determine that the two consecutive transmission units belong to the same datagram, and
- reassemble the two consecutive transmission units based on respective sequence numbers to recover the datagram.

20. The system of claim 19, wherein the processor is further configured to:
- when the index numbers of two consecutive transmission units are the same but the sequence numbers of the two consecutive transmission units are non-continuous, determine at the second network device that the two consecutive transmission units belong to different datagrams.

* * * * *